United States Patent
Kanamoto et al.

(10) Patent No.: US 10,252,385 B2
(45) Date of Patent: Apr. 9, 2019

(54) TOOL CHANGING METHOD AND TOOL CHANGER

(71) Applicant: DMG Mori Co., LTD., Nara (JP)

(72) Inventors: Masao Kanamoto, Nara (JP); Yutaka Saito, Nara (JP)

(73) Assignee: DMG MORI CO., LTD., Nara (JP)

( * ) Notice: Subject to any disclaimer, the term of this patent is extended or adjusted under 35 U.S.C. 154(b) by 171 days.

(21) Appl. No.: 15/325,129

(22) PCT Filed: Apr. 21, 2015

(86) PCT No.: PCT/JP2015/062067
§ 371 (c)(1),
(2) Date: Jan. 10, 2017

(87) PCT Pub. No.: WO2016/031298
PCT Pub. Date: Mar. 3, 2016

(65) Prior Publication Data
US 2017/0190008 A1   Jul. 6, 2017

(30) Foreign Application Priority Data
Aug. 26, 2014 (JP) .................... 2014-171403

(51) Int. Cl.
*B23Q 3/157* (2006.01)
*B23Q 11/00* (2006.01)
*B23Q 3/155* (2006.01)

(52) U.S. Cl.
CPC ....... *B23Q 3/1574* (2013.01); *B23Q 3/15503* (2016.11); *B23Q 3/15713* (2013.01);
(Continued)

(58) Field of Classification Search
CPC ............ Y10T 483/10; Y10T 483/1748; Y10T 483/1755; Y10T 483/1757; Y10T 483/176;
(Continued)

(56) References Cited

U.S. PATENT DOCUMENTS 3,691,626 A * 9/1972 Mousseau ............ B23Q 3/1574
483/41
4,833,772 A * 5/1989 Kobayashi ......... B23Q 3/15526
483/44
(Continued)

FOREIGN PATENT DOCUMENTS

DE   102005043602 A1   3/2007
EP      0855245 A1     7/1998
(Continued)

OTHER PUBLICATIONS

European Search Report for Related Patent Application No. 158352751; dated Apr. 3, 2018.

*Primary Examiner* — Erica E Cadugan
*Assistant Examiner* — Michael Vitale
(74) *Attorney, Agent, or Firm* — Miller, Matthias & Hull LLP (57) ABSTRACT

A tool changer is composed of a support shaft, a forward/backward movement drive motor moving the support shaft upward and downward, a rotation drive motor rotating the support shaft about an axis, a tool change arm having tool grippers formed at both ends thereof, and an air blow mechanism discharging compressed air to a tool and a next tool gripped by the tool grippers. In tool change using this tool changer, in a positioning operation, the tool change arm is rotated by degrees and compressed air is discharged toward the tool and the next tool by the air blow mechanism.

3 Claims, 6 Drawing Sheets

(52) U.S. Cl.
CPC ........ *B23Q 11/005* (2013.01); *B23Q 11/0042* (2013.01); *B23Q 2003/155439* (2016.11); *Y02P 70/171* (2015.11); *Y10T 483/10* (2015.01); *Y10T 483/15* (2015.01); *Y10T 483/1755* (2015.01); *Y10T 483/1767* (2015.01)

(58) Field of Classification Search
CPC ........ Y10T 483/1767; Y10T 483/1769; B23Q 3/15713; B23Q 2003/155414; B23Q 2003/155418; B23Q 2003/155425; B23Q 2003/155428
USPC .......... 483/1, 36, 39, 40, 41, 44, 45
See application file for complete search history.

(56) References Cited

U.S. PATENT DOCUMENTS

| | | | | |
|---|---|---|---|---|
| 5,353,823 | A * | 10/1994 | Peter | B23Q 11/0042 134/1 |
| 6,090,026 | A * | 7/2000 | Hosokawa | B23Q 1/4852 483/36 |
| 6,490,941 | B1 * | 12/2002 | Hur | B01D 29/03 74/25 |
| 6,857,995 | B2 * | 2/2005 | Maeda | B23Q 3/15526 483/38 |
| 7,150,705 | B2 * | 12/2006 | Kojima | B23Q 3/15526 483/1 |
| 2001/0037888 | A1 * | 11/2001 | Akamatsu | B23Q 3/1554 173/2 |
| 2005/0009679 | A1 * | 1/2005 | Fujimoto | B23Q 3/15706 483/13 |
| 2005/0032615 | A1 * | 2/2005 | Sato | B23Q 3/1552 483/13 |

FOREIGN PATENT DOCUMENTS

| | | |
|---|---|---|
| JP | S63131342 | 8/1988 |
| JP | H0577129 A | 3/1993 |
| JP | 2001162483 A | 6/2001 |
| JP | 2003311569 A | 11/2003 |
| JP | 2004268177 A | 9/2004 |

* cited by examiner

TOOL CHANGING METHOD AND TOOL CHANGER

BACKGROUND

Field of the Disclosure

The present invention relates to a tool changing method that changes a tool attached to a spindle of a machine tool with a next tool positioned at a standby position, and to a tool changer used therefor. More particularly, the present invention relates to a tool changing method and a tool changer which are capable of removing chips and the like adhering to the tools at the time of tool change.

Background of the Disclosure

In the field of machine tools having a tool changer, in changing a tool attached to a spindle, chips may adhere to a tapered portion of the tool, or the tool with chips adhering thereto may be stored into a tool magazine and then the chips may fall off the tool and adhere to tapered portions of other tools. It is known that there is a problem that, if such a tool with chips adhering to its tapered portion is attached to the spindle, the adhering chips cause the tool to be attached with an axis of the tool not aligned with an axis of the spindle or to be attached with the chips jammed between the tapered portion of the tool and the tapered hole of the spindle, and thereby the tool and the spindle are damaged; consequently, machining accuracy is reduced.

Accordingly, there has been proposed a tool changer and a method of preventing adhesion of chips to a tool or removing chips from a tool, as disclosed in Japanese Unexamined Patent Application Publication No. 2004-268177, which tool changer and method solve the above-mentioned problem by preventing adhesion of chips and the like to a tool or, if chips and the like adhere to a tool, removing them from the tool.

This conventional tool changer includes a tool magazine that holds a plurality of tools, and a tool change arm that has a gripper for gripping a tool and changes a tool attached to a spindle with one of the tools held by the tool magazine; the tool magazine includes holders that are disposed on a circumference of a circle having a center on a rotary shaft and hold the plurality of tools, a tool magazine drive motor that rotates the rotary shaft to index one of the tools held by the holders to a predetermined position, and other components. Further, the tool change arm can be rotated about a support shaft by a tool change arm drive motor, and is positioned by the tool change arm drive motor so that the gripper is positioned at a position facing the spindle or a position facing the indexed holder of the tool magazine. Note that operation of the tool magazine drive motor is controlled by tool magazine control means and operation of the tool change arm drive motor is controlled by tool change arm control means.

According to this tool changer, when a tool attached to the spindle is returned to the tool magazine, the tool change arm is positioned so that the gripper is positioned at the position facing the spindle, and the tool is gripped by the gripper and detached from the spindle. Thereafter, the tool change arm is positioned so that the gripper is positioned at the position facing a holder indexed at the predetermined position, and the tool gripped by the gripper is transferred to the holder. Further, when a tool held by the holder is attached to the spindle, the tool change arm is positioned so that the gripper is positioned at the position facing the indexed holder, and the tool held by the holder is gripped by the gripper and detached from the holder. Thereafter, the tool change arm is positioned so that the gripper is positioned at the position facing the spindle, and the tool gripped by the gripper is attached to the spindle.

The tool magazine control means in this tool changer is configured not only to control the operation of indexing one of the holders of the tool magazine to the predetermined position but also to control an operation of repeating normal rotation and reverse rotation of the tool magazine drive motor with a predetermined period or repeating rotation and stopping of the tool magazine drive motor with a predetermined period, whereby the tool magazine is vibrated and chips adhering to the tools are removed by the vibration.

Further, the tool change arm control means is configured not only to control the operation of positioning the tool change arm so that the gripper is positioned at the position facing the spindle or the position facing the holder of the tool magazine but also, similarly to the above, to control an operation of repeating normal rotation and reverse rotation of the tool change arm drive motor with a predetermined period or repeating rotation and stopping of the tool change arm drive motor with a predetermined period, whereby the tool change arm is vibrated and chips are removed from the tool.

SUMMARY OF THE DISCLOSURE

Technical Problem

However, because of being configured to remove chips by applying vibration to tools, the above-described conventional tool changer has a problem that, when vibration is applied during machining of a workpiece, the vibration is propagated to a machined portion and thereby machining accuracy is reduced.

Further, in the conventional tool changer, vibration is generated by controlling the operation of repeating normal rotation and reverse rotation of the tool magazine or repeating rotation and stopping thereof and the operation of repeating normal rotation and reverser rotation of the tool change arm or repeating rotation and stopping thereof; the operation times required for the operations are longer than those required when rotating them in a single direction. Therefore, if vibration is applied at a timing other than during machining of a workpiece, such as at a timing of tool change, a problem is caused that the time required for tool change is significantly increased; consequently, workpiece machining time is increased.

The present invention has been achieved in view of the above-described circumstances, and an object thereof is to provide a tool changing method and a tool changer which are capable of removing chips and the like adhering to tools while suppressing reduction in workpiece machining accuracy and minimizing increase in machining time.

Solution to Problem

The present invention, for solving the above-described problems, relates to a method of changing a tool attached to a spindle of a machine tool with a next tool positioned at a standby position by using a tool change arm having a tool gripper at each of both ends thereof and provided to be rotated about an axis of a support shaft disposed parallel to the spindle of the machine tool and to be moved forward and backward along a direction of the axis of the support shaft,
the tool attached to the spindle of the machine tool being changed with the next tool positioned at the standby position by executing:

a gripping operation of rotating the tool change arm about the axis of the support shaft from an original position so as to cause one of the tool grippers to grip the tool attached to the spindle and cause the other of the tool grippers to grip the next tool positioned at the standby position;

a pulling operation of moving the tool change arm forward along the support shaft so as to pull the tool out of the spindle, a positioning operation of rotating the tool change arm about the axis of the support shaft so as to position the next tool gripped by the other of the tool grippers on an axis of the spindle;

an attaching operation of moving the tool change arm backward along the support shaft so as to attach the next tool gripped by the other of the tool grippers to the spindle; and a returning operation of rotating the tool change arm about the axis of the support shaft so as to return the tool change arm to the original position, and the tool change arm being rotated by $(180+n \times 360)$ degrees in the positioning operation.

Note that n is a positive integer.

The present invention further relates to a tool changer disposed at a tool change position in a machine tool for changing a tool attached to a spindle with a next tool positioned at a standby position, including:

a tool change arm having a tool gripper at each of both ends thereof;

a support shaft provided parallel to the spindle for supporting the tool change arm;

a rotating mechanism rotating the tool change arm about an axis of the support shaft; and a forward/backward moving mechanism moving the tool change arm forward and backward along the support shaft, the tool changer being configured to perform:

a gripping operation of causing the rotating mechanism to rotate the tool change arm about the axis of the support shaft from an original position so as to cause one of the tool grippers to grip the tool attached to the spindle and cause the other of the tool grippers to grip the next tool positioned at the standby position;

a pulling operation of causing the forward/backward moving mechanism to move the tool change arm forward along the support shaft so as to pull the tool out of the spindle;

a positioning operation of causing the rotating mechanism to rotate the tool change arm about the axis of the support shaft so as to position the tool gripped by the other of the tool grippers on an axis of the spindle, an attaching operation of causing the forward/backward moving mechanism to move the tool change arm backward along the support shaft so as to attach the next tool gripped by the other of the tool grippers to the spindle; and a returning operation of causing the rotating mechanism to rotate the tool change arm about the axis of the support shaft so as to return the tool change arm to the original position, and the rotating mechanism rotating the tool change arm by $(180+n \times 360)$ degrees when performing the positioning operation.

Note that n is a positive integer.

According to the tool changing method and the tool changer, because they are configured to rotate the tool change arm by $(180+n \times 360)$ degrees in the positioning operation that is performed after the pulling operation, chips and coolant adhering to the tool and next tool pulled out of the spindle and tool gripper can be removed using a centrifugal force produced at the time of rotating the tool change arm.

Note that the time required for rotating the tool change arm by 360 degrees is sufficiently shorter than the time required for a series of operations for tool change; therefore, if the angle of rotation of the tool change arm is set to an appropriate angle, such as 540 degrees, 900 degrees, 1260 degrees, or the like, the tool change operation time is not significantly increased and significant increase in machining time can be suppressed.

Further, chips, etc. adhering to the tool and next tool are removed during the tool change operation; therefore, the problem of reduction in workpiece machining accuracy due to vibration or the like is not caused.

Note that the tool changer may be configured to further include an air blow mechanism composed of a discharge nozzle discharging compressed air, a compressed air supply supplying compressed air, and a supply channel connected to the discharge nozzle and the compressed air supply for supplying compressed air to the discharge nozzle, the discharge nozzle being disposed to discharge compressed air toward the tool and next tool gripped by the tool grippers of the tool change arm.

This configuration allows chips and coolant adhering to the tool and next tool to be more reliably removed by synergy between the centrifugal force produced at the time of rotating the tool change arm and an air pressure applied to surfaces of the tools by compressed air being discharged toward the tools. Note that it is effective to discharge compressed air in synchronization with a timing when the centrifugal force becomes largest.

In the case where the air blow mechanism is provided, for efficiently discharging compressed air toward the tools, it is preferred that the discharge nozzle is disposed on the support shaft or the tool change arm.

As described above, in the tool changing method and tool changer according to the present invention, the tool change arm is rotated by an angle greater than the angle of rotation needed for switching the positions of the tool and next tool in the tool change operation; therefore, chips and coolant adhering to the tools can be removed using a centrifugal force produced by the rotation of the tool change arm. Further, chips, etc. are removed simultaneously with tool change; therefore, machining of a workpiece is less influenced. Furthermore, the time required for rotating the tool change arm by an angle greater than the minimum angle of rotation needed for tool change is sufficiently shorter than the time required for tool change; therefore, chips, etc. can be removed while minimizing influence on machining time.

DETAILED DESCRIPTION

Hereinafter, a specific embodiment of the present invention will be described with reference to the drawings.

Figure 1:
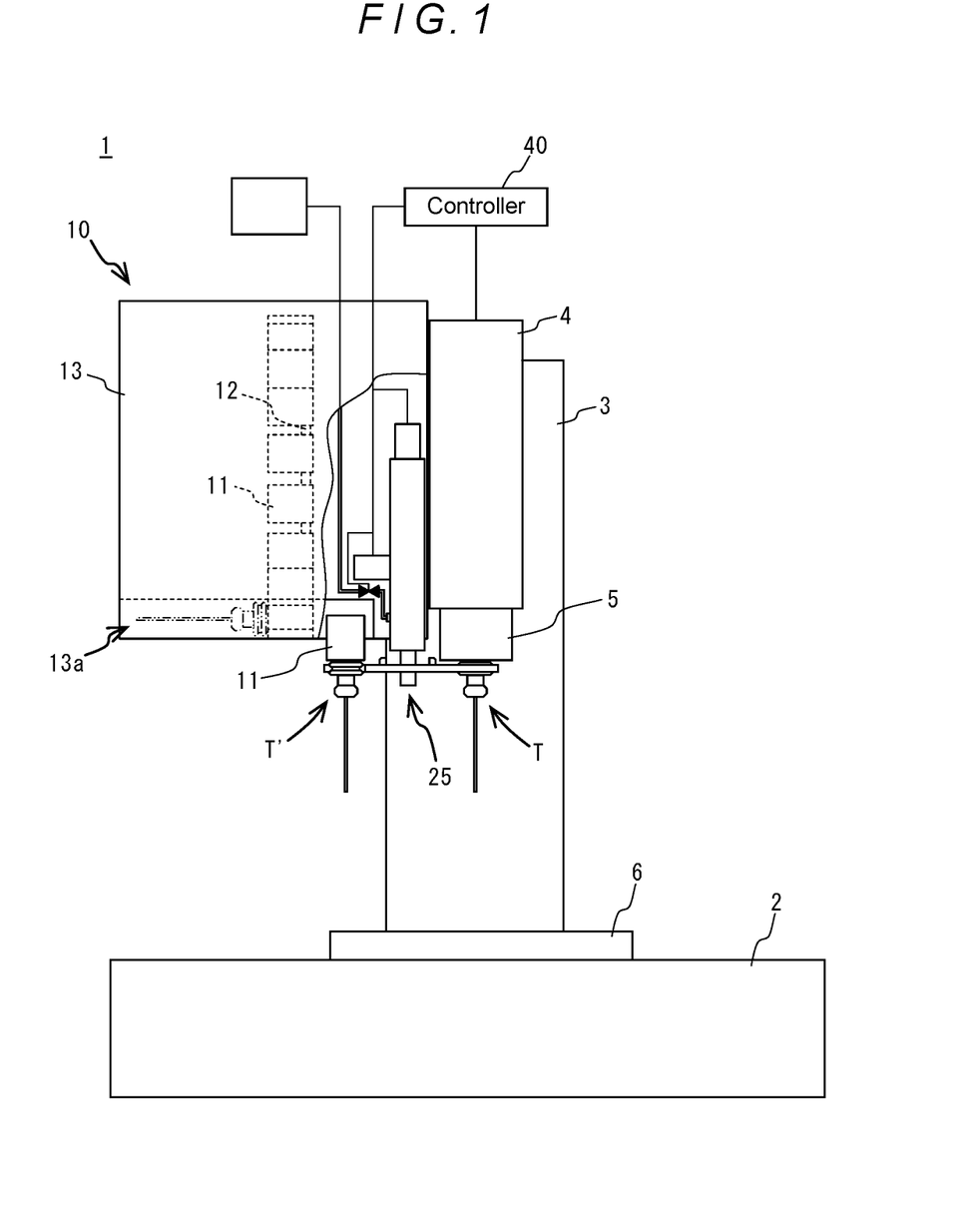
FIG. 1 is a front view of a schematic configuration of a machine tool having a tool changer according to an embodiment of the present invention.

As shown in FIG. 1, a machine tool 1 in this embodiment is a vertical machining center, and is composed of a bed 2, a column 3 erected on the bed 2, a spindle head 4 supported by the column 3 to be moved in a vertical direction by an appropriate feed mechanism, a spindle 5 supported by the spindle head 4 to be rotatable about an axis thereof and rotated by an appropriate spindle motor incorporated in the spindle head 4, a table 6 disposed on the bed 2 below the spindle 5, a tool magazine 10 disposed at a side of the spindle head 4, a tool changer 20 provided on the tool magazine 10 for changing a tool T attached to the spindle 5 with a tool T' stored in a tool pot 11 of the tool magazine 10, and a controller 40 controlling operations of the above-mentioned components.

The tool magazine 10 is composed of a plurality of tool pots 11 holding tools T', a circular plate-shaped holding plate 12 holding the tool pots 11 at regular intervals on an outer peripheral portion thereof, and a cover body 13 surrounding the tool pots 11 and the holding plate 12 and having an opening 13a formed in a lower portion thereof. Further, the holding plate 12 is configured to be driven and rotated about a center axis thereof by an appropriate rotation drive mechanism (not shown), and, by rotating the holding plate 12, one of the tool pots 11 held by the holding plate 12 that holds a desired tool T' can be indexed to a position corresponding to the opening 13a of the cover body 13 (hereinafter, this position is referred to as "index position"). Further, the tool pot 11 indexed to the index position is turned in a vertical plane by an appropriate turning mechanism (not shown) to transfer it to a standby position at which the tool pot 11 is parallel to the spindle 5, and the tool pot 11 transferred to the standby position is similarly turned in a vertical plane by the turning mechanism to transfer it back to the index position.

Figure 2:
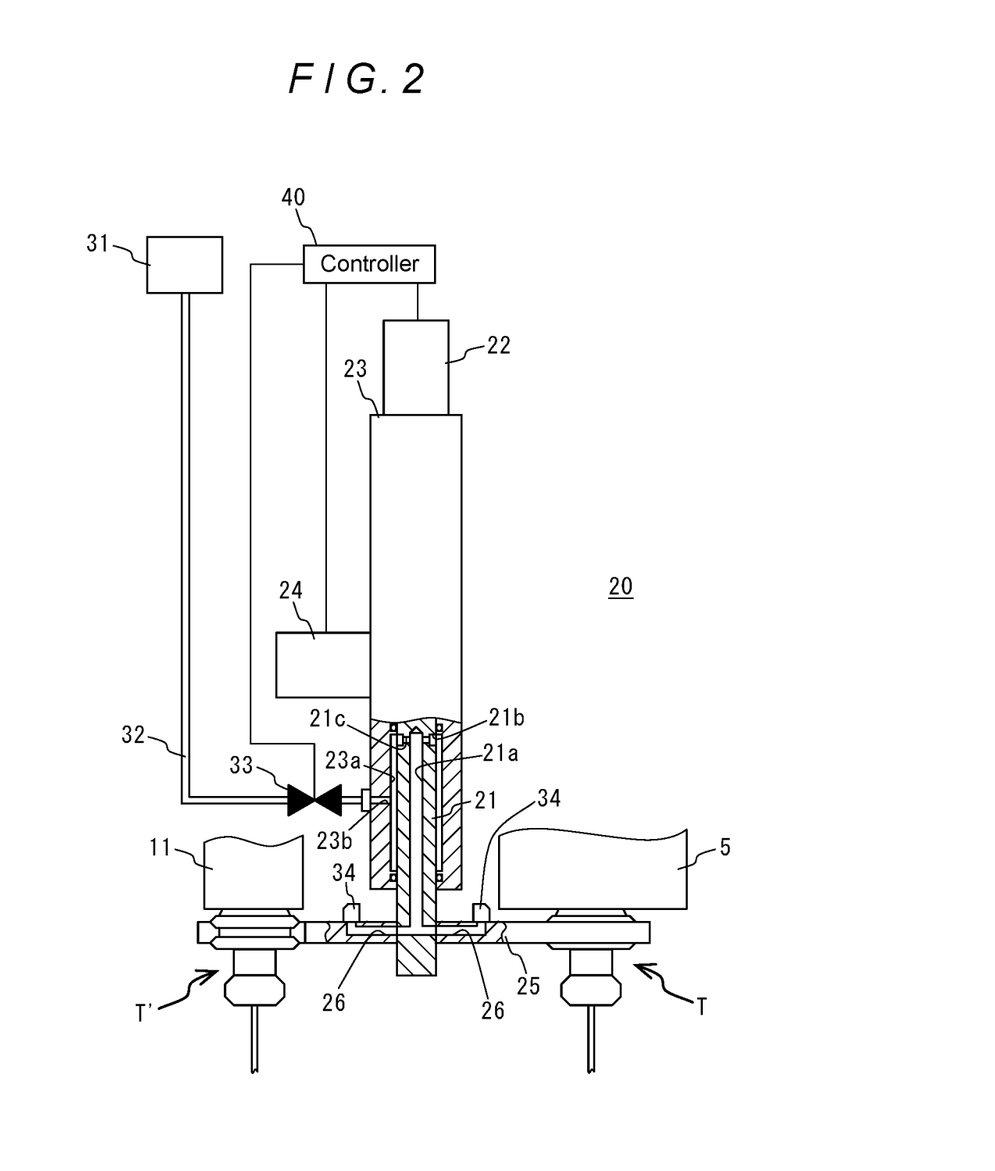
FIG. 2 is a front view of a schematic configuration of the tool changer, which shows a state where tools are attached to a spindle and a tool pot.
Figure 3:
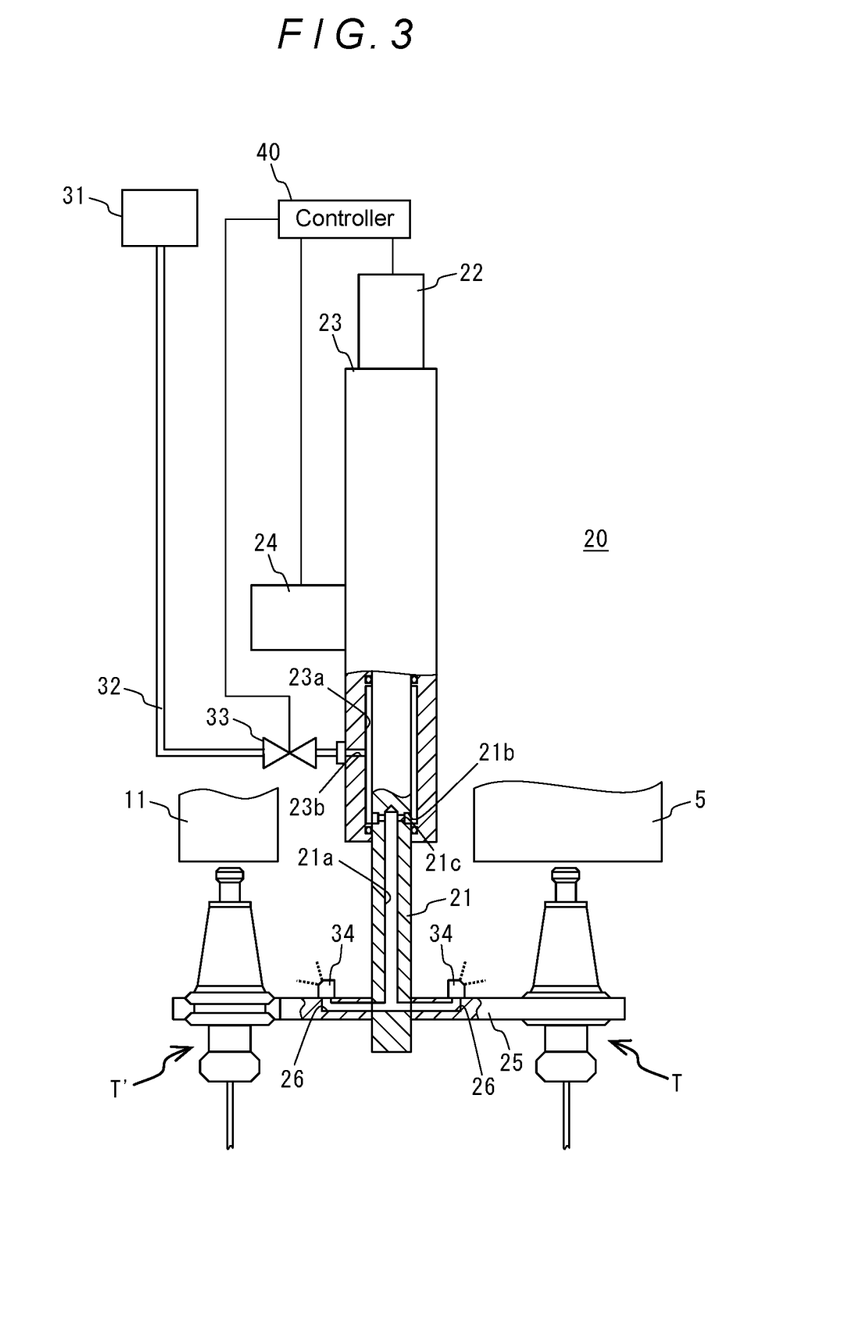
FIG. 3 is a front view of the schematic configuration of the tool changer, which shows a state where the tools have been pulled out of the spindle and the tool pot.
Figure 4:
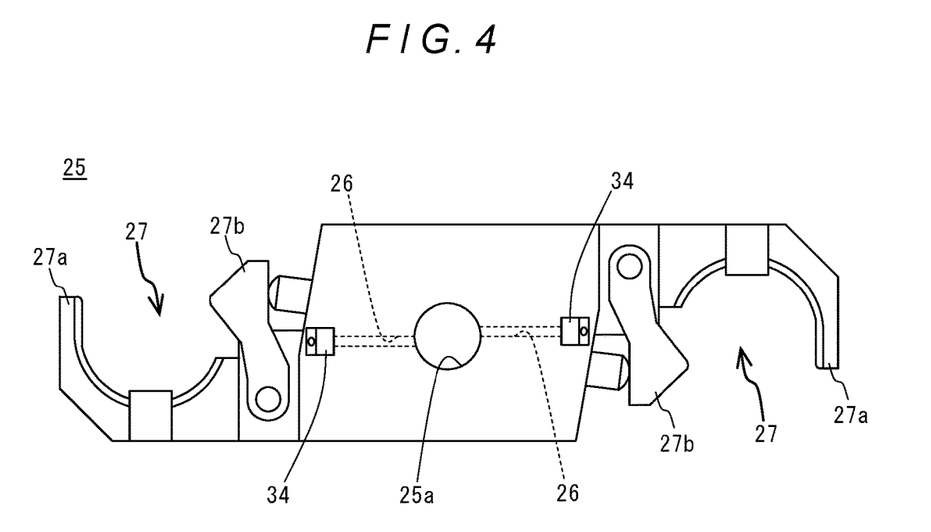
FIG. 4 is a plan view of a schematic configuration of a tool change arm.
Figure 5:
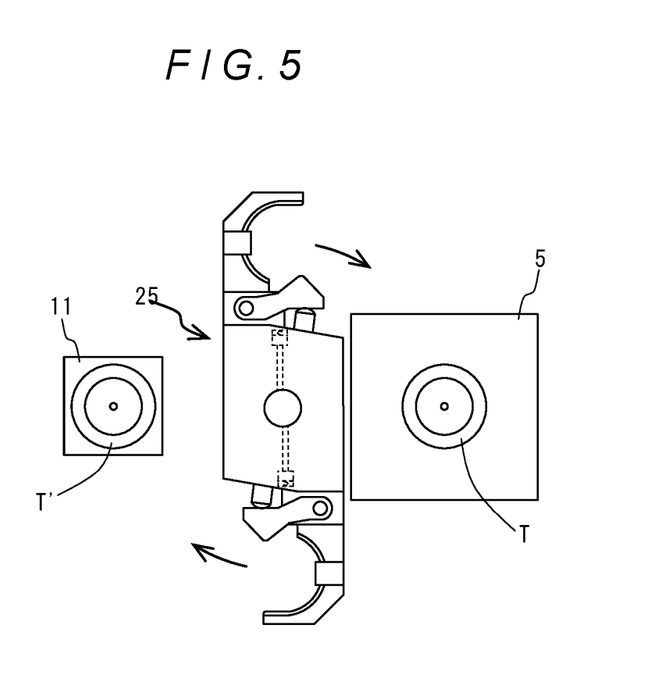
FIG. 5 is an illustration for explaining a rotational position of the tool change arm in a tool change operation.
Figure 6:
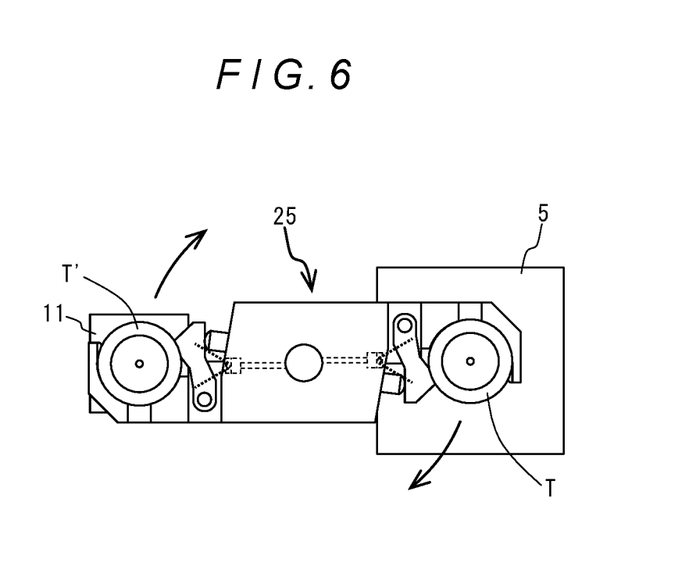
FIG. 6 is an illustration for explaining a rotational position of the tool change arm in the tool change operation.
Figure 7:
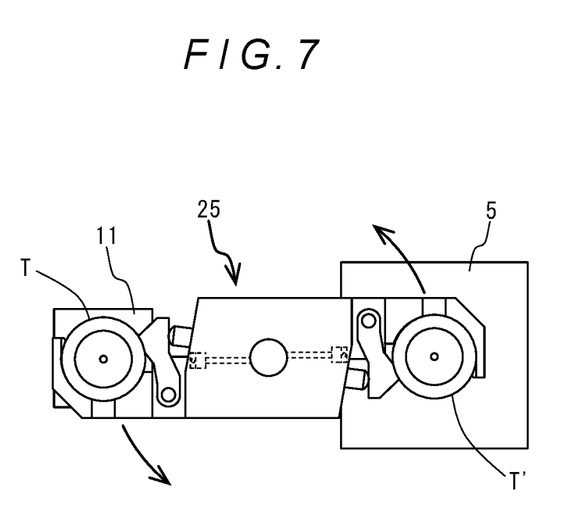
FIG. 7 is an illustration for explaining a rotational position of the tool change arm in the tool change operation.
Figure 8:
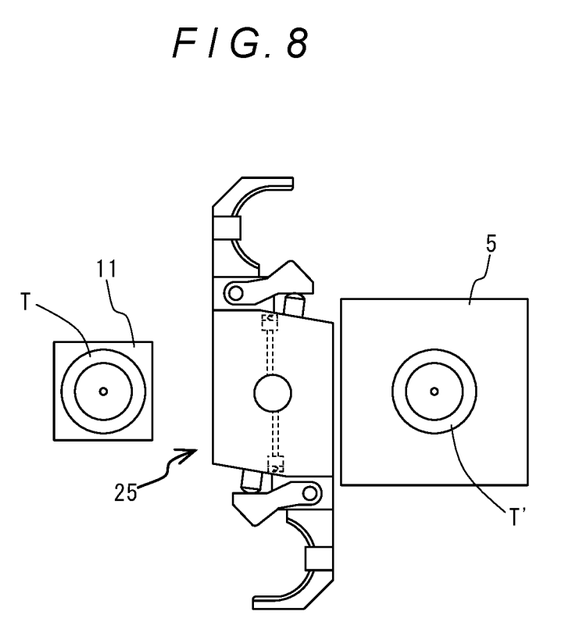
FIG. 8 is an illustration for explaining a rotational position of the tool change arm in the tool change operation.

Further, as shown in FIGS. 2 to 4, the tool changer 20 is composed of a support shaft 21 that is disposed midway between the spindle 5 and a tool pot 11 transferred to the standby position to have an axis parallel to the axis of the spindle 5, a forward/backward movement drive motor 22 that is fixed to a top surface of a housing 23 for moving the support shaft 21 upward and downward, a rotation drive motor 24 that is fixed to a side surface of the housing 23 for rotating the support shaft 21 about the axis thereof, a tool change arm 25 that has tool grippers 27 formed at both ends thereof for gripping tools T and T' and is fixed to a lower end portion of the support shaft 21, and an air blow mechanism 30 that discharges compressed air from air nozzles 34 provided on the tool change arm 25. Note that a mechanism that includes the forward/backward movement drive motor 22 and a ball screw (not shown) screwed with a rear end of the support shat 21 and moves the support shaft 21 upward or downward by rotating the support shaft 21 with the forward/backward movement drive motor 22 forms a forward/backward moving mechanism. Further, a mechanism that includes the rotation drive motor 24 and a bevel gear mechanism (not shown) meshing with a spline (not shown) formed on an outer peripheral surface of the rear end side of the support shaft 21 and rotates the support shaft 21 about the axis thereof through the bevel gear mechanism by rotating the rotation drive motor 24 forms a rotating mechanism.

The support shaft 21 has a groove 21b formed in an outer peripheral surface of an intermediate portion thereof, which is formed along a circumferential direction. The support shaft 21 also has a supply channel 21a formed therein, which is formed along the axis of the support shaft 21 and has two openings in an outer peripheral surface of a lower end portion of the support shaft 21. Note that the supply channel 21a and the groove 21b communicate with each other through a supply channel 21c.

Further, the housing 23 has a recess 23a formed in a portion of an inner peripheral surface thereof, which is formed along a circumferential direction. The housing 23 also has a supply channel 23b formed therein, which is open to a bottom surface of the recess 23a at one end and is open to an outer peripheral surface of the housing 23 at the other end. Note that the recess 23a is formed to have a width greater than that of the groove 21b of the support shaft 21, and, under the state where the support shaft 21 is inserted in the housing 23, the groove 21b and the recess 23a face each other and they consistently communicate with each other even during rotation of the support shaft 21.

A body of the tool change arm 25 has a through hole 25a formed therein, in which the support shaft 21 is inserted. The body of the tool change arm 25 also has two supply channels 26 formed therein, which are open to a wall of the though hole 25a, extend from the wall of the through hole 25a toward the ends of the tool change arm 25, and are open to an upper surface of the body of the tool change arm 25. Further, the tool change arm 25 is attached to the support shaft 21 in a state where the support shaft 21 is inserted in the through hole 25a and the supply channel 21a communicates with the supply channels 26 through the openings in the outer peripheral surface of the support shaft 21 and the openings in the wall of the though hole 25a.

Each of the tool grippers 27 of the tool change arm 25 is composed of a fixed jaw 27a having an arcuate shape in plan view, and a movable jaw 27b supported by the body of the tool change arm 25 in a state of facing the fixed jaw 27a. When the tools T and T' are pulled out of the spindle 5 and the tool pot 11, the movable jaws 27b are fixed in a state where a predetermined gripping force is applied to the tools T and T' by the fixed jaws 27a and the movable jaws 27b.

The air blow mechanism 30 is composed of a compressor 31 as a compressed air supply that supplies compressed air, a supply pipe 32 connected to the compressor 31 at one end and connected to the supply channel 23b formed in the housing 23 at the other end, a solenoid valve 33 disposed in the supply pipe 32 between the compressor 31 and the supply channel 23b, and the air nozzles 34 that are attached to the openings in the upper surface of the body of the tool change arm 25, the opening and closing of the solenoid valve 33 being controlled by the controller 40.

In this air blow mechanism 30, by bringing the solenoid valve 33 into an open state, compressed air is supplied from the compressor 31 to the air nozzles 34 through the supply pipe 32, the supply channel 23b, the recess 23a, the groove 21b, the supply channel 21c, the supply channel 21a, and the supply channels 26, and the compressed air is discharged from the air nozzles 34. Note that the air nozzles 34 are attached so that their discharge outlets are oriented so as to spray compressed air to at least tapered portions of the tools T and T' pulled out of the spindle 5 and tool pot 11.

Further, the controller 40 controls the vertical movement of the spindle head 4 and the rotational movement of the spindle 5, and also controls operations of the forward/backward movement drive motor 22 and rotation drive motor 24 and the opening and closing of the solenoid valve 33.

Next, a sequence of tool change in the machine tool 1 having the above-described configuration is described in detail with reference to FIG. 3 and FIGS. 5 to 8. Note that FIGS. 5 to 8 show views of the tool change arm 25 seen from below.

In the machine tool 1 in this embodiment, after a workpiece is machined by a tool T attached to the spindle 5 with the tool change arm 25 positioned at an original position (see FIG. 5), if a next tool T' that is of a different type from the tool T is used in the next machining, the spindle 5 together with the spindle head 4 are first moved to a position where the tool can be changed (tool change position). Further, as described above, the tool pot 11 holding the next tool T' is indexed to the index position by the appropriate rotation drive mechanism and then transferred to the standby position by the appropriate turning mechanism.

Subsequently, a gripping operation is performed. Specifically, the rotation drive motor 24 is actuated to rotate the support shaft 21 by 90 degrees in the normal direction. Thereby, the tool change arm 25 is rotated about the support shaft 21 in the direction indicated by arrow in FIG. 6 from the original position and is positioned at a gripping position that is located at a position rotated 90 degrees from the original position, and the tool T attached to the spindle 5 and the next tool T' transferred to the standby position are gripped by the tool grippers 27 (see FIG. 6).

Subsequently, the forward/backward movement drive motor 22 is actuated to move the support shaft 21 downward. Thereby, as shown in FIG. 4, the tool change arm 25 is moved downward in a state of gripping the tool T and the next tool T' with the tool grippers 27, whereby the tools T and T' are pulled out of the spindle 5 and the tool pot 11, respectively (pulling operation).

Thereafter, a positioning operation is performed. That is, the rotation drive motor 24 is actuated to rotate the support shaft 21 by (180+n×360) degrees in the normal direction, whereby the tool change arm 25 is rotated by (180+n×360) degrees in the same direction (the direction indicated by arrow in FIG. 6). Thereby, the positions of the tool T and next tool T' are switched, that is, the next tool T' is moved to a position below the spindle 5 and the tool T is moved to a position below the tool pot 11 (see FIG. 7).

Thus, in performing the positioning operation, the tool change arm 25 is intentionally rotated by (180+n×360) degrees, not by the minimum angle of rotation (180 degrees) needed for switching the positions of the tool T and next tool T', which allows chips and coolant adhering to the tools T and T' to be removed using a centrifugal force produced by the rotation of the tool change arm 25 simultaneously with the switching of the positions of the tool T and next tool T'. Note that the angle of rotation of the tool change arm 25 (in other words, the value of n) can be set to an appropriate value which does not excessively lengthen the tool change operation time, such as 540 degrees (n=1), 900 degrees (n=2), 1260 degrees (n=3), or the like.

Further, in the positioning operation, the solenoid valve 33 is brought into the open state at a timing when the centrifugal force produced by the rotation of the tool change arm 25 becomes largest, that is, at a timing when the rotational speed of the tool change arm 25 becomes largest. Thereby, compressed air supplied from the compressor 31 is discharged from the air nozzles 34 toward the tool T and the next tool T' (see the broken lines in FIGS. 3 and 6). This allows the tools to become subject not only to the action of the centrifugal force but also to the action of an air pressure of the compressed air discharged from the air nozzles; synergy between them enables a more effective removal of chips and coolant.

Note that examples of the manner of causing the controller 40 to discharge compressed air at the timing when the rotational speed of the tool change arm 25 becomes largest includes a manner in which a rotational angular position at which the rotational speed of the tool change arm 25 becomes largest is previously obtained from an appropriate rotary encoder, which is provided on the rotation drive motor 24, and stored in the controller 40 through a preliminary operation, and, when performing the tool change operation, the controller 40 receives a signal output from the rotary encoder and, at a timing when the received signal becomes the previously stored rotational angular position, brings the solenoid value 33 into the open state to discharge compressed air from the air nozzles, and a manner in which, when performing the tool change operation, the controller 40 processes a signal output from the rotary encoder and detects a timing when acceleration of the tool change arm 25 becomes almost zero (that is, the rotational speed becomes largest), and, at the detected timing, brings the solenoid valve 33 into the open state to discharge compressed air from the air nozzles.

Subsequently, an attaching operation is performed. Specifically, the forward/backward movement drive motor 22 is actuated to move the support shaft 21 upward, thereby attaching the tool T to the tool pot 11 and attaching the next tool T' to the spindle 5.

Thereafter, for performing a returning operation, the rotation drive motor 24 is actuated to rotate the support shaft 21 by 90 degrees in the reverse direction. Thereby, the tool change arm 25 is rotated by 90 degrees in the same direction (the direction indicated by arrow in FIG. 7) from the gripping position and returned to the original position (see FIG. 8), and then the series of operations for tool change is ended.

After the tool change operation is ended, machining of the workpiece is resumed using the next tool T' attached to the spindle 5.

As described above, according to the machine tool 1 in this embodiment, the tool change arm 25 is rotated by (180+n×360) degrees in the positioning operation in the tool change operation; therefore, chips and coolant adhering to the tool T and next tool T' can be removed while minimizing influence on machining of a workpiece and preventing significant increase in machining time.

Thus, one embodiment of the present invention has been described above; however, the present invention is not limited thereto and can be implemented in other modes.

For example, although, in the above embodiment, compressed air is discharged from the air nozzles 34 at the timing when the rotational speed of the tool change arm 25 becomes largest in the positioning operation, compressed air may be, for example, continuously discharged or intermittently discharged during the positioning operation. Alternatively, compressed air may be continuously or intermittently discharged during the period of time from the pulling operation to the attaching operation.

Further, although, in the above embodiment, compressed air is supplied to the air nozzles 34 attached to the upper surface of the body of the tool change arm 25 through the supply channel 21a formed in the support shaft 21 and the supply channels 26 formed in the body of the tool change arm 25, the manner in which compressed air is supplied is not limited thereto. For example, an embodiment is possible in which air nozzles are attached to an outer peripheral surface of the support shaft 21 and a supply channel for supplying compressed air to the air nozzles is formed in the support shaft 21. Also in this embodiment, compressed air can be discharged toward the tools T and T' gripped by the tool grippers 27.

Further, the air blow mechanism 30 is not necessarily provided, and adhering chips and coolant may be removed only by the action of the centrifugal force produced by the rotation of the tool change arm 25.

Furthermore, although, in the above embodiment, the vertical movement of the support shaft 21 is performed with the forward/backward movement drive motor 22 and the rotation of the support shaft 21 is performed with the rotation drive motor 24, the present invention is not limited thereto. An embodiment is possible in which a support shaft is connected to a single drive motor through an appropriate cam mechanism and the support shaft is moved upward and downward or rotated by rotating the drive motor and transmitting a rotational power to the cam mechanism.

Further, in the above embodiment, the tool T positioned at the tool change position and the next tool T' positioned at the standby position are swung into the tool grippers 27 by rotating the tool change arm 25 from the original position, whereby the tools T and T' are gripped. However, for example, an H-shaped tool change arm may be employed instead of an S-shaped one, in which case two tool grippers of the tool change arm are positioned at a tool change position and a standby position in advance and the spindle 5 and the tool pot 11 are moved toward the tool grippers 27.

What is claimed is:

1. A method of changing a tool attached to a spindle of a machine tool with a next tool positioned at a standby position by using a tool change arm having a tool gripper at each of both ends thereof and provided to be rotated about an axis of a support shaft disposed parallel to the spindle of the machine tool and to be moved forward and backward along a direction of the axis of the support shaft, the tool attached to the spindle of the machine tool being changed with the next tool positioned at the standby position by executing:

a gripping operation of rotating the tool change arm about the axis of the support shaft from an original position so as to cause one of the tool grippers to grip the tool attached to the spindle and cause the other of the tool grippers to grip the next tool positioned at the standby position;

a pulling operation of moving the tool change arm forward along the direction of the axis of the support shaft so as to pull the tool out of the spindle, a positioning operation of rotating the tool change arm about the axis of the support shaft so as to position the next tool gripped by the other of the tool grippers on an axis of the spindle;

an attaching operation of moving the tool change arm backward along the direction of the axis of the support shaft so as to attach the next tool gripped by the other of the tool grippers to the spindle; and a returning operation of rotating the tool change arm about the axis of the support shaft so as to return the tool change arm to the original position, wherein the tool change arm is rotated by 180+(n×360) degrees in the positioning operation, n being a positive integer.

2. The method according to claim 1, wherein, at least during execution of the positioning operation, compressed air is blown to each of the tool and the next tool gripped by the one of the tool grippers and the other of the tool grippers, respectively, of the tool change arm.

3. The method according to claim 1, wherein, at least during execution of the positioning operation, compressed air is blown to each of the tool and the next tool gripped by the one of the tool grippers and the other of the tool grippers, respectively, of the tool change arm at a timing when a centrifugal force produced by rotation of the tool change arm becomes largest.

* * * * *